Dec. 7, 1937. C. R. ANDERSON 2,101,487
RACK FOR COOKING UTENSILS
Filed Feb. 12, 1936

Carl R. Anderson
INVENTOR.

BY
ATTORNEYS.

Patented Dec. 7, 1937

2,101,487

UNITED STATES PATENT OFFICE 2,101,487

RACK FOR COOKING UTENSILS

Carl R. Anderson, Erie, Pa., assignor to The Griswold Manufacturing Company, Erie, Pa., a corporation of Pennsylvania Application February 12, 1936, Serial No. 63,513

3 Claims. (Cl. 53—1)

The present invention is designed to provide for cooking utensils, such as roasting pans, a supporting rack on which the material being cooked may be placed. In carrying out the invention the rack is provided with handles by means of which the rack may be lifted from the receptacle. Preferably the support is provided with a top rack detachably secured to the handles which may be utilized in spacing cans in which material is placed for sterilization. The invention also contemplates such an arrangement of handles that they may be folded on to the support so that the support and handles and the top rack may be packed or stored in a minimum of space. Features and details of the invention will more fully appear from the specification and claims.

Figure 1:
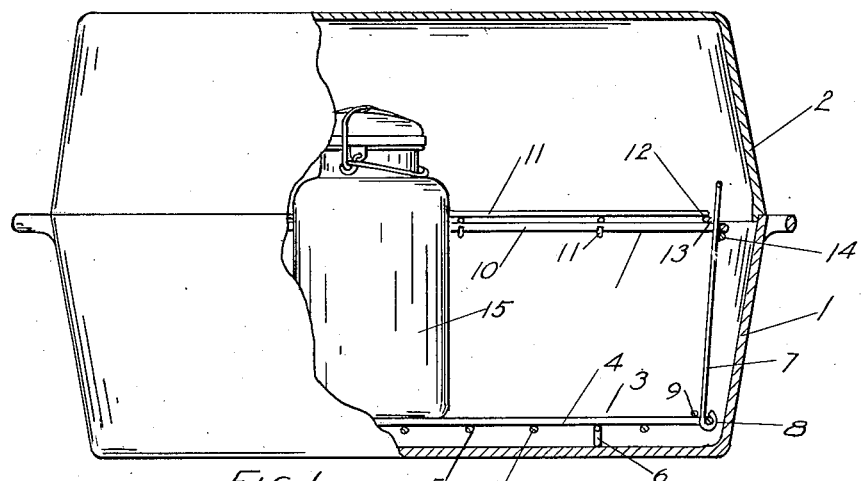

A preferred embodiment of the invention is illustrated in the accompanying drawing, wherein:

Fig. 1 shows a cooking receptacle in the form of a roasting pan partly in section.

Figure 2:
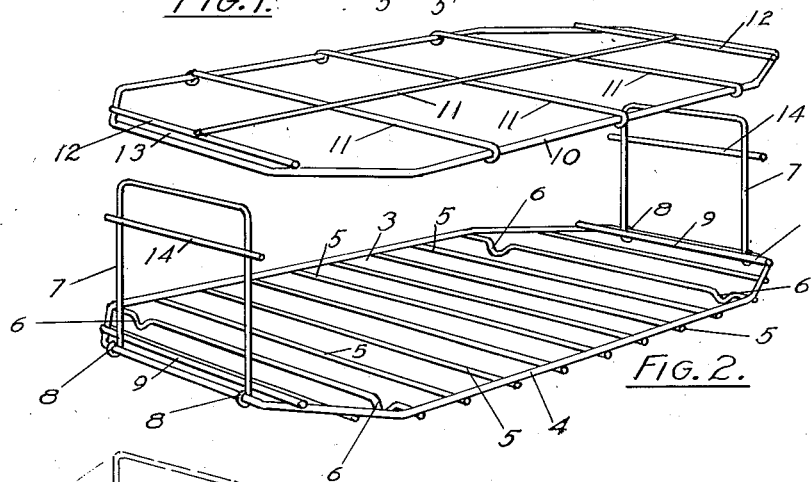

Fig. 2 a perspective view of the rack with the top rack spaced from its assembled position.

Figure 3:
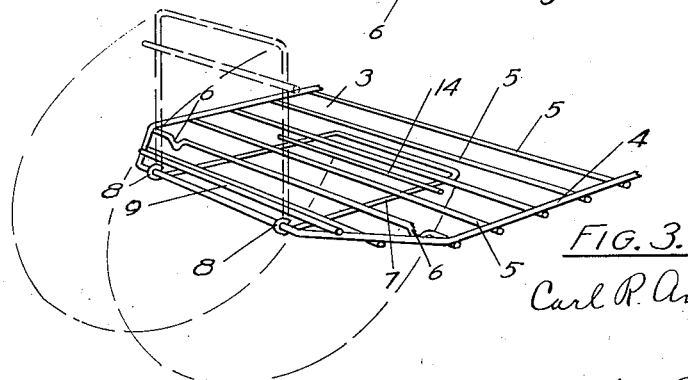

Fig. 3 a perspective view of the end of the bottom rack with the handle folded in the packing or storage position.

1 marks the pan of the cooking receptacle, 2 the cover.

The bottom rack 3 forming the support for the material is formed of wire and comprises a surrounding or frame wire 4 and a series of supporting cross wires 5 secured to the frame wire. Two of the cross wires have downward bends 6 forming feet supporting the bottom rack above the base of the receptacle.

Handles 7 are in the form of wire bails which have eyes 8 in the lower ends, encircling the end portions of the frame 4, the eyes providing a pivotal connection permitting the folding of the handle into closed position under the bottom rack. Preferably this bail is in inverted U form.

Stop bars 9 extend across the frame and are secured to the frame wire 4 in position to limit the pivotal movement of the handles 7 so as to hold these handles in a vertical position.

A top rack is formed by a surrounding wire 10, forming the frame for the top rack, and a series of spaced wires 11 providing openings which will locate cans 15 on the bottom rack. Cross bars 12 adjacent to the ends of the surrounding wire provide openings or slots 13 between wires 12 and the frame which are adapted to receive the upper ends of the bail so as to position the top rack. The bails have the cross bars 14 which form stops positioning the top rack vertically with the desired space above the bottom rack.

This rack affords a means supporting material being cooked or roasted out of contact with the bottom of the pan. It provides a means whereby the material being cooked may be readily lifted from the pan. The handles also are designed to receive the top rack so that the lower rack may be used in canning with proper spacing and retaining of the cans in the space position. The possibility of folding the handles adapts for shipping and for storing.

What I claim as new is:

1. A rack for cooking utensils comprising a wired grid comprising a surrounding frame and cross bars; wire handles in the form of U shaped bails having eyes at their ends through which the bails are pivotally secured on the rack frame in foldable relation to the rack; and a top rack formed of wire comprising a surrounding frame and spacing wires extending from edge to edge of the frame, the said rack having cross bars adjacent to the ends of the frame providing slots for receiving the handles, said handles having cross wires extending from side to side of the bail forming positioning stops for the top rack and bracing the bail.

2. A rack for cooking utensils comprising a wired grid comprising a surrounding frame and cross bars; wire handles in the form of U shaped bails having eyes at their ends through which the bails are pivotally secured on the grid frame in foldable relation to the rack; and a cross bar on the grid adjacent to the end of the grid in position to provide a stop locating the handles in vertical position.

3. A rack for cooking utensils comprising a wired grid comprising a surrounding frame and cross bars; wire handles in the form of U shaped bails having eyes at their ends through which the bails are pivotally secured on the grid frame in foldable relation to the rack; a top rack formed of wire comprising a surrounding frame and spacing wires extending from edge to edge of the frame, the said top rack having cross bars adjacent to the ends of the frame providing slots for receiving the handles; and a cross bar on the grid adjacent to the handles locating the handles in a vertical position.

CARL R. ANDERSON.